(12) United States Patent
Bales et al.

(10) Patent No.: US 10,924,280 B1
(45) Date of Patent: Feb. 16, 2021

(54) DIGITAL NOTARY USE IN DISTRIBUTED LEDGER TECHNOLOGY (DLT) FOR BLOCK CONSTRUCTION AND VERIFICATION

(71) Applicant: Sprint Communications Company L.P., Overland Park, KS (US)

(72) Inventors: Mark R. Bales, Lee's Summit, MO (US); Ronald R. Marquardt, Woodinville, WA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 122 days.

(21) Appl. No.: 16/384,872

(22) Filed: Apr. 15, 2019

(51) Int. Cl.
  *H04L 9/32* (2006.01)
  *H04L 29/06* (2006.01)
(52) U.S. Cl.
  CPC .......... *H04L 9/321* (2013.01); *H04L 63/0428* (2013.01); *H04L 2209/38* (2013.01)
(58) Field of Classification Search
  CPC . H04L 9/321; H04L 63/0428; H04L 2209/38; H04L 63/123; H04L 9/3236; H04L 9/3247
  See application file for complete search history.

(56) References Cited

U.S. PATENT DOCUMENTS

2017/0243193 A1* 8/2017 Manian ................ G06Q 20/065
2019/0190719 A1* 6/2019 van de Ruit ............ G06F 21/64
2019/0361869 A1* 11/2019 Krabbenhoft ......... H04L 9/3239
2020/0134578 A1* 4/2020 Shi ........................ G06Q 20/24
2020/0175003 A1* 6/2020 Jiang .................. G06F 16/2365
2020/0266989 A1* 8/2020 Krcmaricic-Barackov ................
                                                          H04L 9/30

OTHER PUBLICATIONS

"Applied Innovation Review", Jun. 2016, Berkeley, Issue #2, p. 1-16.*
Salimitari et al, "An Overview of Blockchain and Consensus Protocols for IoT Networks", Sep. 14, 2018, Department of Computer Science, University of Central Florida, p. 1-13.*

* cited by examiner

*Primary Examiner* — Christopher A Revak

(57) ABSTRACT

A method of using a digital notary in distributed ledger technology for block construction and verification is disclosed that comprises creating, via a birth block creator server in a network, a birth block comprising electronic device information associated with an electronic device and an instruction set. The method also comprises confirming, by a digital notary server in the network, that the instruction set was built in trust and adding, by the digital notary server, a digital notary component to the birth block in response to the confirmation. The method further comprises creating a subsequent block for the electronic device that comprises the instruction set and the digital notary component, validating the subsequent block based on the digital notary component without consensus from a plurality of consensus servers in the network, and storing the subsequent block in response to the validation.

20 Claims, 7 Drawing Sheets

US 10,924,280 B1

DIGITAL NOTARY USE IN DISTRIBUTED LEDGER TECHNOLOGY (DLT) FOR BLOCK CONSTRUCTION AND VERIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Distributed ledger technology (DLT) uses independent nodes in a network to record, share, and synchronize digital data. Traditionally DLT maintains records in a secure manner by a consensus mechanism amongst the nodes in the network to prevent modification of the records. There is no central administrator or centralized data storage used in DLT.

SUMMARY

In an embodiment, a method of using a digital notary in distributed ledger technology (DLT) for block construction and verification is disclosed. The method comprises creating, via a birth block creator server in a network, a birth block comprising electronic device information associated with an electronic device and an instruction set. The birth block is stored in a non-transitory memory of the electronic device. The method also comprises confirming, by a digital notary server in the network, that the instruction set was built in trust, adding, by the digital notary server, a digital notary component to the birth block in response to confirming that the instruction set was built in trust, and creating a subsequent block for the electronic device. The subsequent block comprises the instruction set and the digital notary component. The method further comprises validating the subsequent block based on the digital notary component without consensus from a plurality of consensus servers in the network and storing the subsequent block in at least one of the non-transitory memory by an application executing on a processor of the electronic device or a block data store in the network in response to the validation.

In another embodiment, a digital notary server is disclosed. The digital notary server comprises a processor, a non-transitory memory, and an application stored in the non-transitory memory. When executed by the processor, the application receives an initial block for an electronic device comprising an instruction set, confirms that the instruction set was built in trust, adds a digital notary component to the initial block in response to confirming that the instruction set was built in trust, and stores the instruction set associated with the digital notary component in the non-transitory memory. The application, when executed by the processor, also receives a subsequent block for the electronic device including the instruction set and the digital notary component, and validates the subsequent block without consensus from a plurality of consensus servers by confirming that the instruction set and the digital notary component in the subsequent block match the stored instruction set and associated digital notary component from the initial block.

In yet another embodiment, a method of using a digital notary in distributed ledger technology (DLT) for block construction and verification is disclosed. The method comprises creating a block for an electronic device comprising an instruction set. The block is stored in a non-transitory memory of the electronic device. The method also comprises confirming, by a digital notary server in the network, that the instruction set was built in trust, adding, by the digital notary server, a digital notary component to the block in response to confirming that the instruction set was built in trust, storing, by the digital notary server, the instruction set associated with the digital notary component in a non-transitory memory of the digital notary server, and creating a subsequent block for the electronic device. The creating of the subsequent block comprises sending a validation request message based on a current instruction set to the digital notary server that comprises the current instruction set and a current digital notary component, validating the subsequent block without consensus from a plurality of consensus servers by confirming, by the digital notary server, that the current instruction set and the current digital notary component match the stored instruction set and associated digital notary component from the block, and in response to the validating, adding, by the digital notary server, a subsequent digital notary component to the subsequent block. The method further comprises storing the subsequent block in at least one of the non-transitory memory by an application executing on a processor of the electronic device or a block data store in the network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
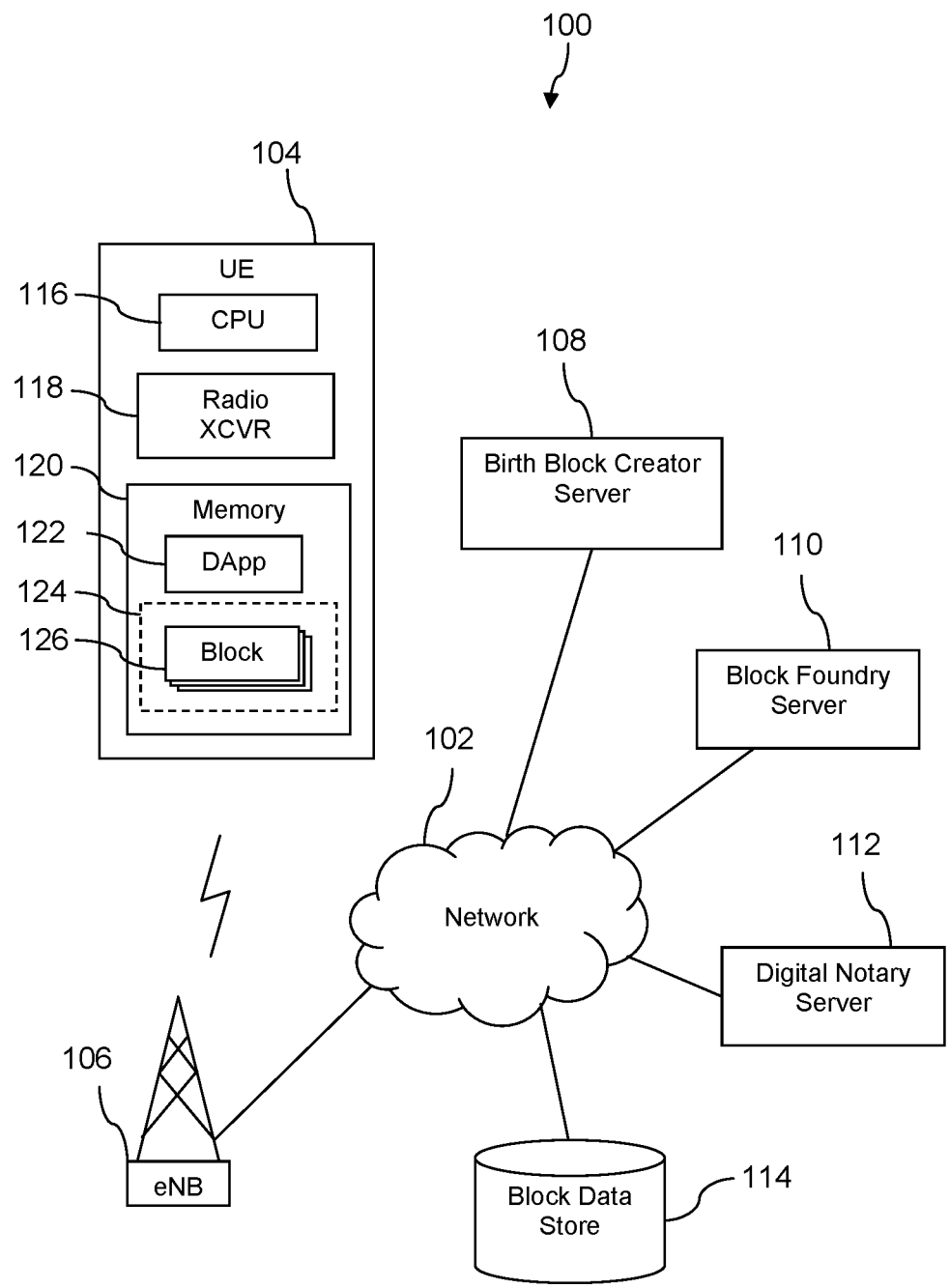
FIG. 1 is a block diagram of a wireless communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Typically distributed ledger technology (DLT) maintains records in a secure manner by a consensus mechanism amongst nodes in the network to prevent modification of the records. The distributed database may be spread across multiple sites, regions, and/or parties. DLT may be used to validate and authenticate data exchanges. Records may be stored in the network once a majority of the nodes in the network achieve consensus. In some forms of DLT, blocks are used to store information and then connected in a chronological technique to form a linked chain of blocks. The linked chain of blocks are resistant to modification of the data stored within a block, where changing or deleting information in a block in the linked chain of blocks invalidates the subsequent blocks. One skilled in the art understands the process of how DLT is used to securely store records, but a basic description is provided here. A block typically comprises at least a block number, a nonce value, a timestamp, a plurality of information (e.g., device information, provisioning information, or event information), which may be considered the useful content of the block, a hash value, and the hash value of the previous block. A block may further comprise at least one pointer that references to at least one of a prior block in the chain. A hash is a string of data with a given size (e.g., 16-bits, 32-bits, 64-bits) that is based on the information in the block (e.g., the block number, the nonce value, the information, and the previous hash).

In order to successfully create a block, a target hash value may be designated. A target hash value may be established to have a certain number of leading zeros in the hash. The nonce value is incrementally varied in order to solve the hash to satisfy the target hash value based on a hashing function (e.g., SHA-1, SHA-256, SHA-512, SHA-3). No meaningful data can be derived from the hash of the block. In other words, the data in the block cannot be back-solved based on the hash. The nodes in the network collectively validate new blocks when a request is sent. Once a block is validated and stored in a chain, it cannot be retroactively altered without invalidating the subsequent blocks. Typically, blocks are validated on a majority rule (e.g., 50%+1 vote) in the network, wherein the majority of nodes in the network are in consensus, or agreement. Each block comprises the hash and the hash of the previous block, which links the two blocks. Therefore, if a validated block within the chain is altered or deleted, the hashes of the succeeding blocks in the chain would become invalid, which would indicate that the chain has been corrupted.

As discussed above, DLT traditionally uses a consensus mechanism to validate blocks. However, consensus mechanisms typically used in DLT to validate blocks require a large amount of computational overhead. Thus, the present disclosure teaches using a third party digital notary in DLT for block construction and verification such that validation of blocks can be performed based on a digital notary component without consensus from a plurality of consensus servers in a network.

When a block chain is initiated, a birth block or a genesis block may be created and all subsequent blocks on that chain may be children of the birth block. When a block chain is initiated for an electronic device, the birth block may comprise electronic device information and may be stored in a non-transitory memory of the electronic device. Once the birth block is successfully created by the birth block creator (e.g., a birth block creator server and/or a block foundry server at the request of another party), the birth block creator may send the birth block including an instruction set to a third party digital notary server and engage the digital notary server to confirm that the birth block was built in trust. The birth block may be determined to be built in trust if it was built by a processor executing in a trust zone. A trust zone or a trusted security zone will be discussed in more detail below. The digital notary server may generate and add a digital notary component to the birth block in response to confirming that the birth block was built in trust. The digital notary component may comprise a unique identifier and an identity of the third party digital notary. The digital notary component may be tag, certificate, token, or another component included in the code of the birth block, which is carried forward to the subsequently created blocks.

The digital notary server may store the digital notary component in a secure storage location such as a non-transitory memory of the digital notary server. The digital notary component may be copied into subsequent blocks in the block chain. At any time, the digital notary component in a subsequent block may be presented to the digital notary server, and the digital notary server may establish whether the digital notary signature in the subsequent block is valid by comparing the digital notary signature to the stored digital notary component from the birth block. The digital notary component in the subsequent block may be validated if it matches the stored digital notary component from the birth block. In response to validation of the digital notary component, which did not include consensus from a plurality of consensus servers in the network, the subsequent block may be stored in at least one of a non-transitory memory of the electronic device or a block data store in the network. If the digital notary component in the subsequent block does not match the stored digital notary component from the birth block, the subsequent block is not validated because the lack of congruence may indicate a malicious change to the block chain.

In addition to storing the digital notary component, the digital notary server may also store the instruction set from the birth block in a secure storage location such as a non-transitory memory of the digital notary server. At any time, the digital notary component and the set of instructions in a subsequent block may be presented to the digital notary server, and the digital notary server may establish whether the digital notary signature and set of instructions in the subsequent block are valid by comparing the digital notary signature and set of instructions in the subsequent block to the stored digital notary component and set of instructions from the birth block. The digital notary component and set of instructions in the subsequent block may be validated if they match the stored digital notary component and set of instructions from the birth block. The subsequent block may be stored in at least one of a non-transitory memory of the electronic device or a block data store in the network in response to the validation, which did not include consensus from a plurality of consensus servers in the network. If the digital notary component and/or the instruction set in the subsequent block do not match the stored digital notary component and/or instruction set from the birth block, the subsequent block is not validated because the lack of congruence may indicate a malicious change to the block chain. The subsequent block may be a life block or an event block.

While use of the third party digital notary is described above with respect to the creation of a birth block, the third party digital notary may instead or additionally be engaged in the creation of a life block or additionally be engaged in the creation of an event block. A life block may be created via a block foundry server in the network in response to the electronic device being provisioned on the network. The life block may comprise provisioning information. An event block may be created via a block foundry server in the network at the request of an application on the electronic device. The event block may comprise event information.

In some embodiments, the third party digital notary may be engaged in creating each block (e.g., a birth block, a life block, an event block, etc.) to provide more traceability and confirmation of safe execution of the block chain. For example, part of the instruction set executed in creating a new, subsequent block may send a validation request message to the digital notary server that comprises a current instruction set and a current digital notary component. As part of the block creation process, the digital notary server may validate the subsequent block without consensus from a plurality of consensus servers by confirming that the current instruction set and current digital notary component match the stored instruction set and associated digital notary component and add a subsequent digital notary component to the subsequent block in response to the validation. The subsequent block may be stored in at least one of a non-transitory memory of the electronic device or a block data store in the network.

The subsequent digital notary component may be the same as the stored digital notary component. For example, in an embodiment, the digital notary component does not change as long as the set of instructions does not change. Alternatively, the subsequent digital notary component may be different than the stored digital notary component. For example, in an alternative embodiment, the digital notary component changes each time the third party digital notary is asked to validate the current digital notary signature and the current set of instructions.

If a legitimate change in the instruction set occurs, a side chain may be established for the block chain. When a side chain is initiated, an initial side chain block may be created and all subsequent side chain blocks on that chain may be children of the initial side chain block. Similar to the creation of the birth block, the third party digital notary may be engaged during creation of the initial side chain block. For instance, during creation of the initial side chain block, the initial side chain block creator may send the initial side chain block including a revised instruction set to the third party digital notary server and engage the digital notary server to confirm that the initial side chain block was built in trust. The initial side chain block may be determined to be built in trust if it was built by a processor executing in a trust zone. The digital notary server may generate and add a different digital notary component to the initial side chain block in response to confirming that the initial side chain block was built in trust.

The digital notary server may store the revised instruction set from the initial side chain block and associated different digital notary component in a secure storage location such as the non-transitory memory of the digital notary server. The different digital notary component may be copied into subsequent side chain blocks in the block chain. At any time, the different digital notary component and the revised set of instructions in a subsequent side chain block may be presented to the digital notary server, and the digital notary server may establish whether the different digital notary signature and revised set of instructions in the subsequent side chain block are valid by comparing the different digital notary signature and revised set of instructions in the subsequent side chain block to the stored different digital notary component and revised set of instructions from the initial side chain block. The different digital notary component and revised set of instructions in the subsequent side chain block may be validated if they match the stored different digital notary component and revised set of instructions from the initial side chain block. The subsequent side chain block may be stored in at least one of the non-transitory memory of the electronic device or a block data store in the network in response to the validation, which did not include consensus from a plurality of consensus servers in the network.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile communication device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile communication device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which was incorporated by reference above. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile communication device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile communication device which may execute in the normal partition operating system described above. The trusted security zone runs a separate operating system for the secure partition that is installed by the mobile communication device manufacturer or vendor, and users are not able to install new applications in or alter the contents of the trusted security zone.

Turning now to FIG. 1, a system 100 is described. In an embodiment, the system 100 comprises a network 102, a user equipment (UE) 104, an eNodeB (eNB) 106, a birth block creator server 108, a block foundry server 110, a digital notary server 112, and a block data store 114. The UE 104 may alternatively be referred to in some contexts as a mobile communication device. The UE 104 may comprise a processor 116, a radio transceiver 118, and a memory 120 with a non-transitory portion comprising an application 122 and a chain of blocks 124. The chain of blocks 124 may comprise of individual blocks 126. In some embodiments, the application 122 may be a distributed application (DApp 122).

The UE 104 may be configured to use the radio transceiver 118 to establish a wireless communication link with an eNB 106 to provide access to the network 102. The radio transceiver 118 of the UE 104 may communicate with the eNB 106 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. In some embodiments, the radio transceiver 118 of the UE 104 may communicate with the eNB 106 using a 5G wireless communication protocol. In some contexts, the eNB 106 may be referred to as a base transceiver station (BTS), a cell tower, or cell site. The network 102 may comprise one or more private networks, one or more public networks, or a combination thereof. For example, the network 102 may comprise a wireless communication network of a wireless communication service provider. The UE 104 may access the network 102 to obtain a variety of communication services.

The UE 104 may be a mobile smart phone, a media player, a personal digital assistant (PDA), a laptop computer, a notebook computer, a tablet computer, a wearable computer, a headset computer, an Internet of Things (IoT) device, or another network communications capable device. The UE 104 may communicate with the network 102 via wireless communications or wired communications. It is understood that any number of UEs 104, any number of eNBs 106, any number of birth block creator servers 108, any number of block foundry servers 110, any number of digital notary servers 112, and any number of block data stores 114 may exist in the system 100. The network 102 may comprise a radio access network (RAN). In an embodiment, the UE 104 may have other components, which are not shown, such as a near field communication (NFC) radio transceiver, a short range radio transceiver such as a WiFi radio transceiver, or other components. The birth block creator server 108, the block foundry server 110, the digital notary server 112, and the block data store 114 may be server computers. Server computers are discussed in more detail hereinafter.

The block foundry server 110 and the block data store 114 may be maintained by a wireless communication service provider while the birth block creator server 108 may be maintained by another party and the digital notary server 112 may be maintained by a different third party. In an embodiment, the birth block creator server is maintained by an original equipment manufacturer (OEM). The third party that maintains the digital notary server 112 may be a party other than the wireless communication service provider and a party other than the party that maintains the birth block creator server. For example, the digital notary server 112 may be maintained or operated by a bank, the Federal Reserve, or another entity.

A chain of blocks 124 may comprise a birth block, which may be the first block in the chain 124. In an embodiment, a single birth block may exist for the life of the UE 104. The birth block may comprise a block number, a hash, a nonce, a timestamp, and a data or content portion comprising a plurality of fields. The plurality of fields may comprise information about the UE 104 including data about the physical components that make up the UE 104. For example, the plurality of fields may comprise one or more hardware component serial numbers, the media access control (MAC) address of the UE 104, the international mobile equipment identity (IMEI) and other information related to the UE 104 such as the date of manufacture, the time of manufacture, the location of manufacture, the name of manufacturer, and/or the purpose of device, wherein each field comprises one piece of data about the device. The birth block may be stored in a non-transitory memory of the UE 104. The birth block may also be stored in the block data store 114 in the network 102.

The birth block may be created when the UE 104 is assembled by the OEM or shortly after the assembly of the UE 104. In an embodiment, the birth block is created via the birth block creator server 108. In some embodiments, the birth block may also be created via the block foundry server 110 at the request of a party such as the OEM. For example, the OEM may send a request comprising a plurality of information about the UE 104 to create a birth block to the block foundry server 110. The birth block creator server 108 and/or the block foundry server 110 may create the birth block comprising the device information preserved in a plurality of fields as well as a block number, a hash, a nonce, and a timestamp. The hash may be the result of processing the information of the birth block with a hash function (e.g., SHA-1, SHA-256, SHA-512, SHA-3) to a string with a fixed size (e.g., 32-bit, 64-bit), wherein the same input data yields the same hash. The nonce may be incrementally varied in order for the hash to satisfy a target hash value. The target hash value may comprise the hash having a certain number of leading zeroes.

Once the birth block is successfully produced by the birth block creator server 108 and/or the block foundry server 110, the birth block including an instruction set may be sent to the digital notary server 112. In an embodiment, the digital notary server 112 confirms that the birth block was built in trust. The birth block may be determined to be built in trust if it was built by a processor executing in a trust zone. If the digital notary server 112 determines that the birth block was built in trust, the digital notary server 112 may generate and add a digital notary component to the birth block. For example, the digital notary server 112 may add the digital notary component to one of the plurality of fields in the birth block. In an embodiment, the digital notary component comprises a unique identifier and an identity of the third party digital notary. The identity of the third party digital notary may be included to direct a block creator, a block reader, or a block consumer to the appropriate third party digital notary for block validation.

The digital notary server 112 may store the digital notary component in a secure storage location such as a non-transitory memory of the digital notary server 112. The digital notary component may be copied into subsequent blocks in the block chain 124. At any time, the digital notary component in a subsequent block may be presented to the digital notary server 112, and the digital notary server 112 may establish whether the digital notary signature in the subsequent block is valid by comparing the digital notary signature in the subsequent block to the stored digital notary component from the birth block. The digital notary component in the subsequent block may be validated if it matches the stored digital notary component from the birth block. If the digital notary component in the subsequent block does not match the stored digital notary component from the birth block, the subsequent block is not validated because the lack of congruence may indicate a malicious change to the block chain.

The digital notary server 112 may also store the instruction set from the birth block in a secure storage location such as a non-transitory memory of the digital notary server 112. At any time, the digital notary component and the set of instructions in a subsequent block may be presented to the digital notary server 112, and the digital notary server 112 may establish whether the digital notary signature and set of instructions in the subsequent block are valid by comparing the digital notary signature and set of instructions in the subsequent block to the stored digital notary component and set of instructions from the birth block. The digital notary component and set of instructions in the subsequent block may be validated if they match the stored digital notary component and set of instructions from the birth block. If the digital notary component and/or the instruction set in the subsequent block do not match the stored digital notary component and/or instruction set from the birth block, the subsequent block is not validated because the lack of congruence may indicate a malicious change to the block chain.

The use of the digital notary server 112 to perform block validation instead of obtaining consensus from a plurality of consensus servers saves resources by reducing computational overhead. The subsequent block may be stored in at least one of a non-transitory memory of the UE 104 or the block data store 114 in the network 102 in response to the validation.

The subsequent block may comprise a life block. After the UE 104 is manufactured, it may reside temporarily in a stationary state in inventory. The UE 104 may be shipped or transferred from the OEM to a vendor who sells the UE 104 to a customer or user. Upon purchasing the UE 104, the UE 104 may be provisioned for communication on the network 102. For example, in the case of a mobile communication device, the UE 104 may be provisioned for use on the network 102 of a wireless communication service provider. A life block may be created to record provisioning information of the UE 104.

If the provisioning of the UE 104 changes during the life of the UE 104, a new life block may be created. The life block(s) may be generated by a server maintained by a service provider or carrier upon provisioning of the UE 104. Alternatively, the service provider or carrier may request the life block(s) be created by the block foundry server 110.

The life block may comprise a block number, a hash, a nonce, a timestamp, and a previous hash. The previous hash links the blocks to form a chain 124. For example, the first life block in a chain 124 may comprise a previous hash that is the hash of the birth block. The life block may further comprise provisioning information and event block generation instructions. The provisioning information may include the service provider, the service provider network, subscriber information, the international mobile subscriber identity (IMSI), and the details of the subscription (e.g., data limit, premium communication service capabilities, preferred roaming lists). The event block generation instructions may comprise conditional logic that provides a guideline that determines the circumstances of when the DApp 122 should request an event block.

In another embodiment, the subsequent block discussed above comprises an event block. The DApp 122 may manage the chain of blocks 124, which may include determining when to request an event block. The DApp 122 may request a new event block from the block foundry server 110 in the network 102. Event blocks may be requested from the block foundry server 110 when the DApp 122 is triggered by the event block generation instructions in the life block. The UE 104 may be configured to notify the DApp 122 to request event block(s). The DApp 122 may send a request to the block foundry server 110 with a plurality of information to be stored in the requested event block. In addition to the general block number, hash, hash of the previous block, nonce value, and timestamp, an event block may comprise event information for example as the data or content portion of the event block. Event information may comprise a variety of data related to the conditions and/or actions that occur on or in the environment of the UE 104.

While use of the third party digital notary is described above with respect to the creation of a birth block, the third party digital notary may instead or additionally be engaged in the creation of a life block. For example, once the life block is successfully produced by the server maintained by a service provider or carrier and/or the block foundry server 110, the life block including an instruction set may be sent to the digital notary server 112. In an embodiment, the digital notary server 112 confirms that the life block was built in trust. The life block may be determined to be built in trust if it was built by a processor executing in a trust zone. If the digital notary server 112 determines that the life block was built in trust, the digital notary server 112 may generate and add a digital notary component to the life block. In an embodiment, the digital notary component comprises a unique identifier and an identity of the third party digital notary. The identity of the third party digital notary may be included to direct a block creator to the appropriate third party digital notary for block validation.

The digital notary server 112 may store the instruction set from the life block and associated digital notary component in a secure storage location such as a non-transitory memory of the digital notary server 112. The digital notary component may be copied into subsequent blocks in the block chain 124. At any time, the digital notary component and the set of instructions in a subsequent block may be presented to the digital notary server 112, and the digital notary server 112 may establish whether the digital notary signature and set of instructions in the subsequent block are valid by comparing the digital notary signature and set of instructions in the subsequent block to the stored digital notary component and set of instructions from the life block. The digital notary component and set of instructions in the subsequent block may be validated if they match the stored digital notary component and set of instructions from the life block. The subsequent block may be stored in at least one of a non-transitory memory of the UE 104 or the block data store 114 in the network 102 in response to the validation.

In some embodiments, the digital notary server 112 may be engaged in creating each block (e.g., a birth block, a life block, an event block, etc.) to provide more traceability and confirmation of safe execution of the block chain. For example, part of the instruction set in creating a new, subsequent block may be to send a validation request message to the digital notary server 112 that comprises a current instruction set and a current digital notary component. As part of the block creation process, the digital notary server 112 may validate the subsequent block without consensus from a plurality of consensus servers by confirming that the current instruction set and current digital notary component match the stored instruction set and associated digital notary component and add a subsequent digital notary component to the subsequent block in response to the validation. The subsequent block may be stored in at least one of a non-transitory memory of the UE 104 or the block data store 114.

The subsequent digital notary component may be the same as the stored digital notary component. For example, in an embodiment, the digital notary component does not change as long as the set of instructions does not change. Alternatively, the subsequent digital notary component may be different than the stored digital notary component. For example, in an alternative embodiment, the digital notary component changes each time the third party digital notary is asked to validate the current digital notary signature and the current set of instructions. In an embodiment, if the digital notary server 112 does not validate the subsequent block, no digital notary component is added to the subsequent block. In such an embodiment, any further blocks added would fail validation because there would be no current digital notary component for comparison against the digital notary component stored by the digital notary server 112. In an alternative embodiment, during the creation of each block, an individual could initiate block validation from the digital notary server 112 instead of having the validation be a part of the instruction set.

In an embodiment, if an authorized change in the instruction set occurs, a side chain is established for the block chain 124. When a side chain is initiated, an initial side chain block may be created and all subsequent side chain blocks on that chain may be children of the initial side chain block. Similar to the creation of the birth block, the digital notary server 112 may be engaged during creation of the initial side chain block. For instance, during creation of the initial side chain block, the initial side chain block creator may send the initial side chain block including a revised instruction set to the digital notary server 112 and engage the digital notary server 112 to confirm that the initial side chain block was built in trust. The initial side chain block may be determined to be built in trust if it was built by a processor executing in a trust zone. The digital notary server 112 may generate and add a different digital notary component to the initial side chain block in response to confirming that the initial side chain block was built in trust.

The digital notary server 112 may store the revised instruction set from the initial side chain block and associated different digital notary component in a secure storage location such as the non-transitory memory of the digital notary server 112. The different digital notary component may be copied into subsequent side chain blocks in the block chain. At any time, the different digital notary component and the revised set of instructions in a subsequent side chain block may be presented to the digital notary server 112, and the digital notary server 112 may establish whether the different digital notary signature and revised set of instructions in the subsequent side chain block are valid by comparing the different digital notary signature and revised set of instructions in the subsequent side chain block to the stored different digital notary component and revised set of instructions from the initial side chain block. The different digital notary component and revised set of instructions in the subsequent side chain block may be validated if they match the stored different digital notary component and revised set of instructions from the initial side chain block. The subsequent side chain block may be stored in at least one of the non-transitory memory of the UE 104 or the block data store 114 in response to the validation.

Another party (other than the digital notary server 112 or the UE 104) may want to know that one or more blocks it consumes or reads are accurate and authentic. That party may use the system disclosed herein to validate the accuracy and authenticity of the one or more blocks. For example, that party may send the one or more blocks including the instruction sets and the digital notary component from the one or more blocks to the digital notary server 112 and the digital notary server 112 may confirm that the received instruction set(s) and digital notary component(s) match instruction set(s) and digital notary component(s) stored by the digital notary server 112. If the digital notary server 112 confirms that the received instruction set(s) and digital notary component(s) match the stored instruction set(s) and digital notary component(s), the accuracy and authenticity of the one or more block(s) are validated. While the system is described above with respect to one UE 104, the digital notary server 112 may provide the same digital notary service discussed above concurrently for many other UEs.

Figure 2:
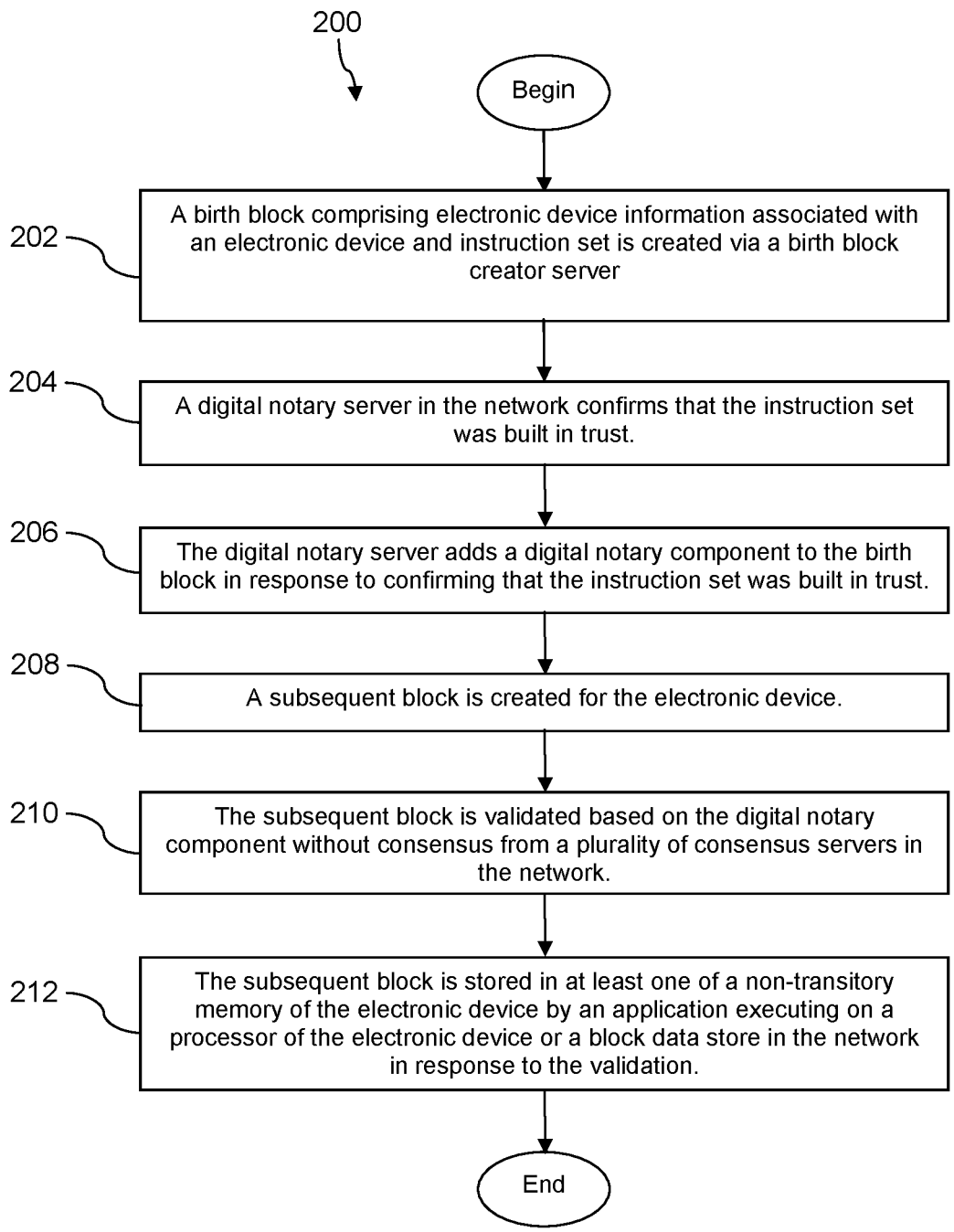
FIG. 2 is a flow chart of a method according to an embodiment of the disclosure.

Turning now to FIG. 2, a method 200 is described. At block 202, a birth block comprising electronic device information associated with an electronic device and instruction set is created via a birth block creator server. At block 204, a digital notary server in the network confirms that the instruction set was built in trust. At block 206, the digital notary server adds a digital notary component to the birth block in response to confirming that the instruction set was built in trust. At block 208, a subsequent block is created for the electronic device. The subsequent block comprises the instruction set and the digital notary component. At block 210, the subsequent block is validated based on the digital notary component without consensus from a plurality of consensus servers in the network. At block 212, the subsequent block is stored in at least one of a non-transitory memory of the electronic device by an application execution on a processor of the electronic device or a block data store in the network in response to the validation.

Figure 3:
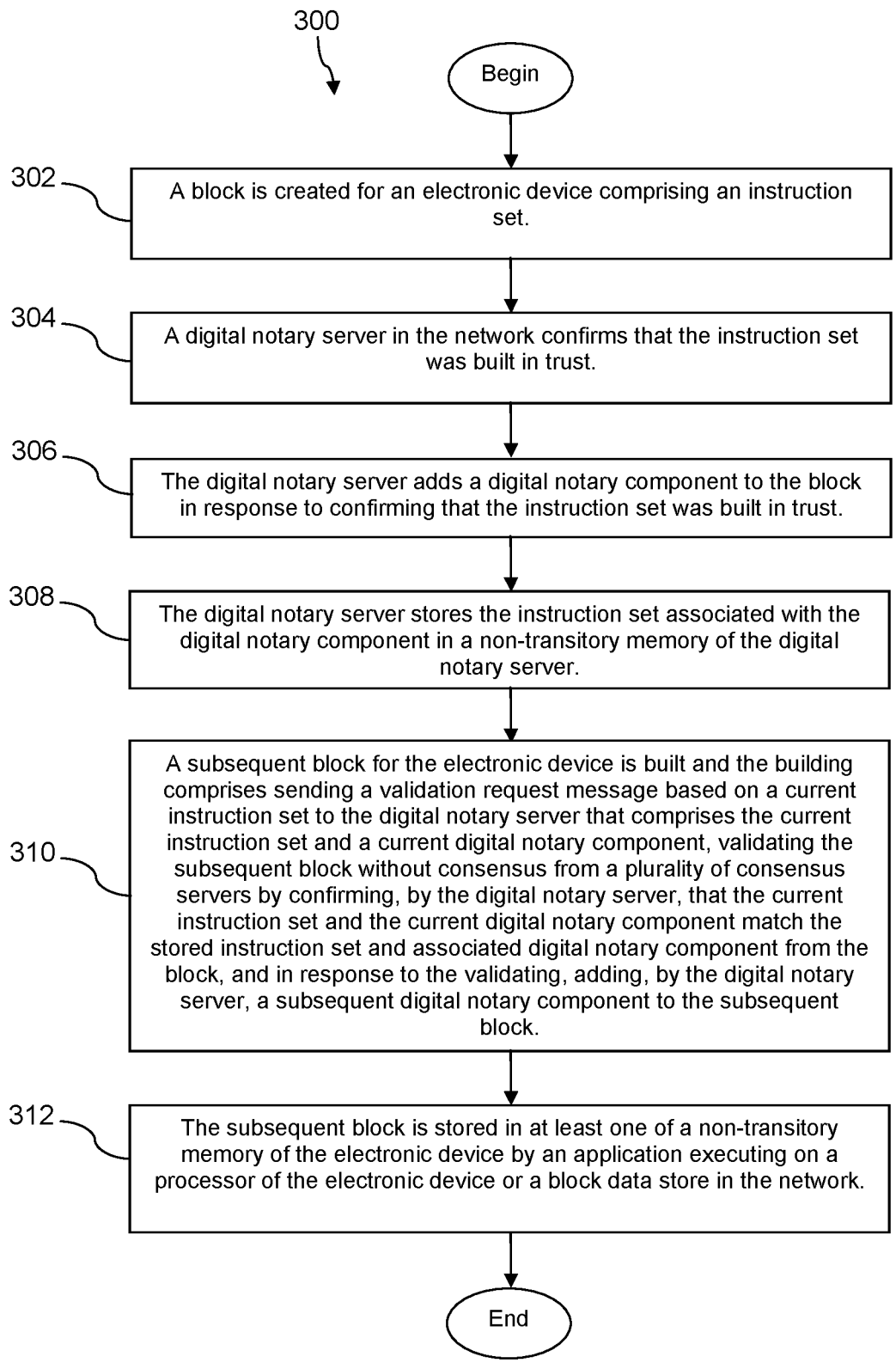
FIG. 3 is a flow chart of a method according to an embodiment of the disclosure.

Turning now to FIG. 3, a method 300 is described. At block 302, a block is created for an electronic device comprising an instruction set. At block 304, a digital notary server in the network confirms that the instruction set was built in trust. At block 306, the digital notary server adds a digital notary component to the block in response to confirming that the instruction set was built in trust. At block 308, the digital notary server stores the instruction set associated with the digital notary component in a non-transitory memory of the digital notary server. At block 310, a subsequent block for the electronic device is built where the building comprises sending a validation request message based on a current instruction set to the digital notary server that comprises the current instruction set and a current digital notary component, validating the subsequent block without consensus from a plurality of consensus servers by confirming, by the digital notary server, that the current instruction set and the current digital notary component match the stored instruction set and associated digital notary component from the block, and adding, by the digital notary server, a subsequent digital notary component to the subsequent block in response to the validating. At block 312, the subsequent block is stored in at least one of a non-transitory memory of the electronic device by an application executing on a processor of the electronic device or a block data store in the network.

Figure 4:
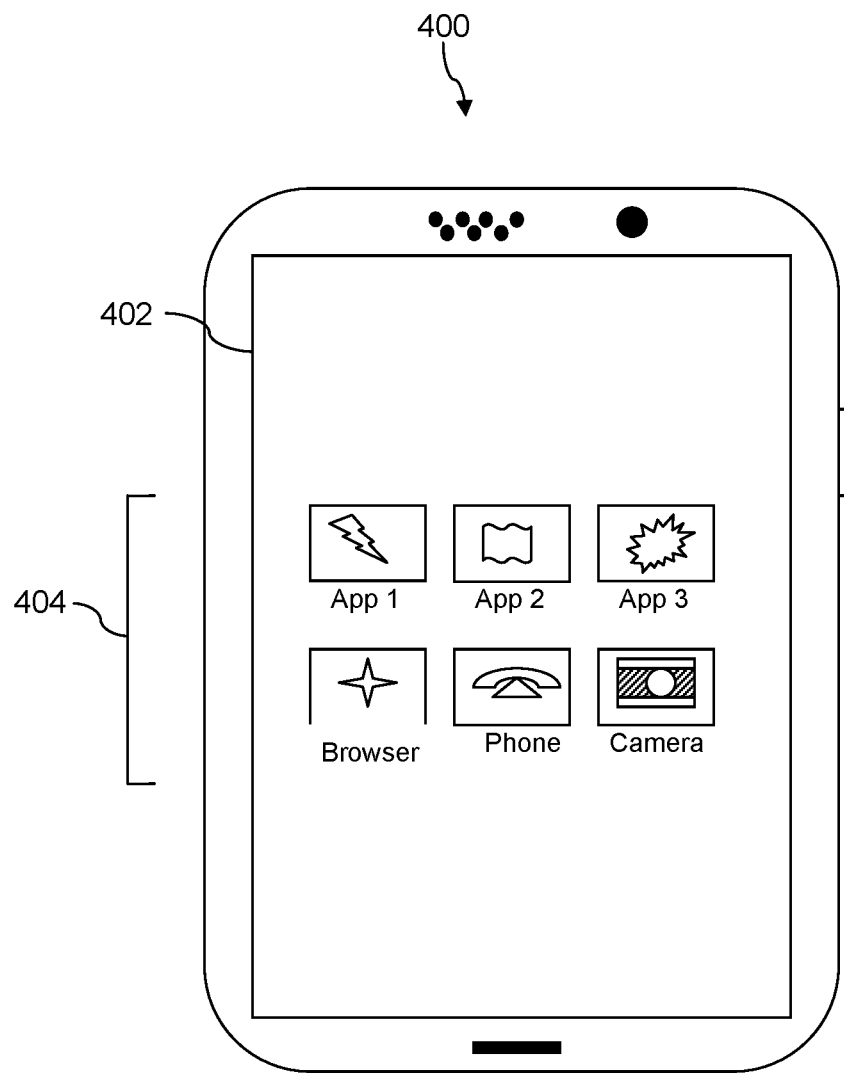
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
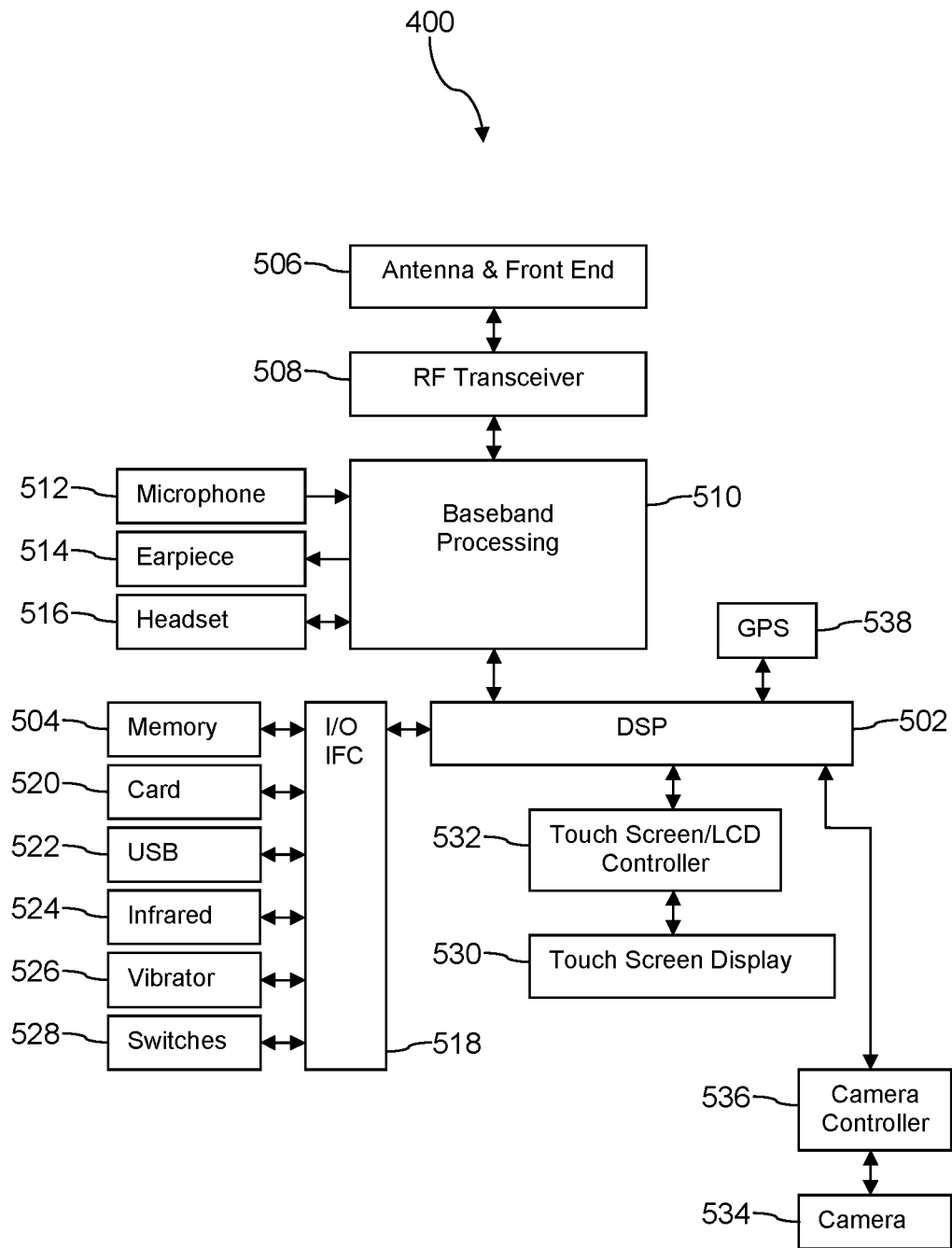
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
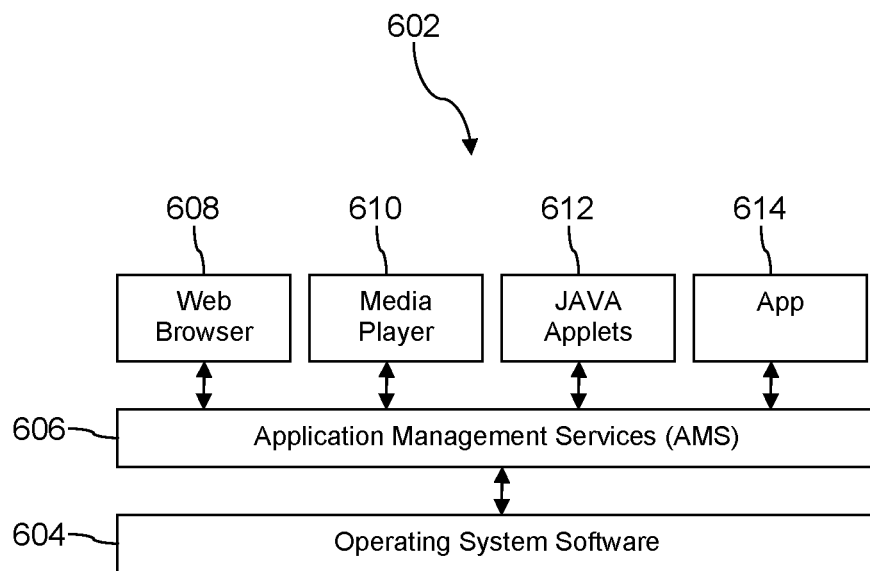
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
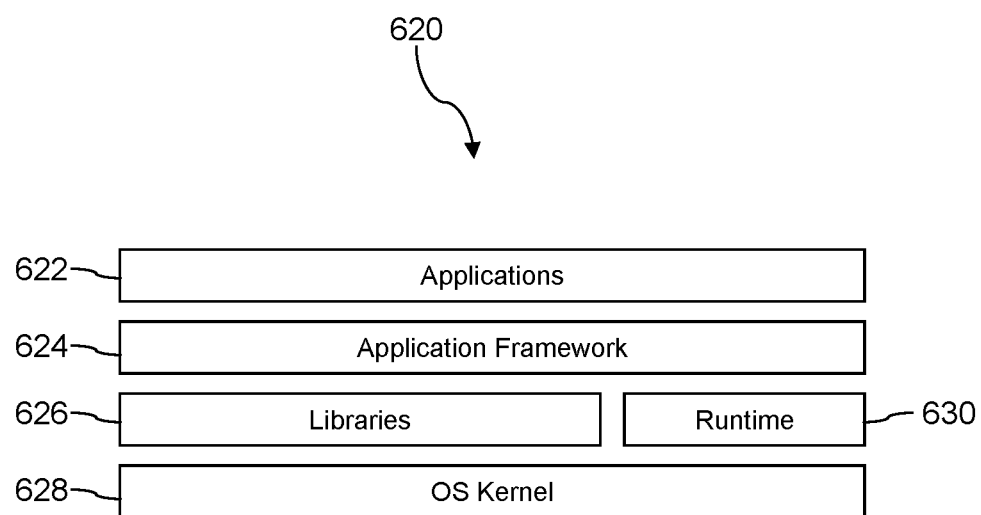
FIG. 6B is a block diagram of a software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
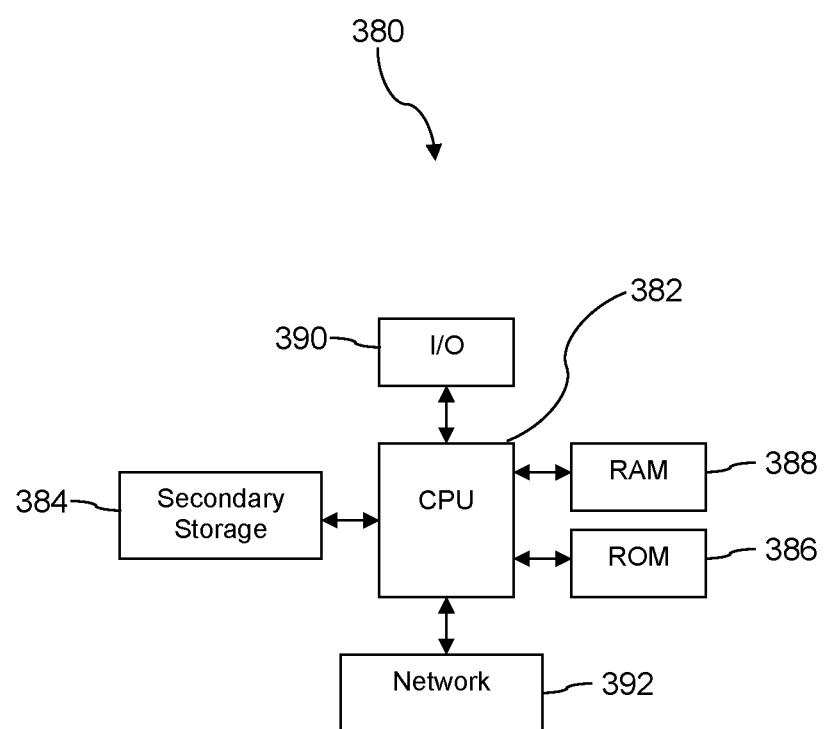
FIG. 7 is block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of using a digital notary in distributed ledger technology (DLT) for block construction and verification, the method comprising:
   creating, via a birth block creator server in a network, a birth block comprising electronic device information associated with an electronic device and an instruction set, wherein the birth block is stored in a non-transitory memory of the electronic device;
   confirming, by a digital notary server in the network, that the instruction set was built in trust;
   adding, by the digital notary server, a digital notary component to the birth block in response to confirming that the instruction set was built in trust;
   creating a subsequent block for the electronic device, wherein the subsequent block comprises the instruction set and the digital notary component;
   validating the subsequent block based on the digital notary component without consensus from a plurality of consensus servers in the network; and
   storing the subsequent block in at least one of the non-transitory memory by an application executing on a processor of the electronic device or a block data store in the network in response to the validation.

2. The method of claim 1, further comprising storing, by the digital notary server, the instruction set associated with the digital notary component in a non-transitory memory of the digital notary server, wherein the validating comprises:
   sending the subsequent block including the instruction set and the digital notary component to the digital notary server; and
   confirming, by the digital notary server, that the instruction set and the digital notary component in the subsequent block match the stored instruction set and associated digital notary component from the birth block.

3. The method of claim 1, wherein the birth block further comprises a block number, a hash, a nonce, a timestamp, and a plurality of fields, and wherein the electronic device information comprises at least one of a hardware component serial number, a media access control (MAC) address of the electronic device, an international mobile equipment identity (IMEI), a date of manufacture, a time of manufacture, a location of manufacture, the name of manufacturer, or a purpose of the electronic device.

4. The method of claim 3, wherein the subsequent block is a life block created via a server maintained by a wireless communication service provider in response to the electronic device being provisioned on the network, and wherein the subsequent block further comprises a block number, a hash, the hash of the birth block, a nonce, a timestamp, and provisioning information.

5. The method of claim 4, wherein the storing of the subsequent block creates a chain of blocks, and wherein the hash of the birth block links the life block and the birth block.

6. The method of claim 1, wherein the subsequent block is an event block created by a block foundry server in response to a triggering event specified in event block generation instructions, and wherein the subsequent block further comprises a block number, a hash, a hash of a previous block, a nonce, a timestamp, and event information associated with the triggering event.

7. The method of claim 1, further comprising:
creating an initial side chain block for the electronic device, wherein the initial side chain block comprises a revised instruction set;
confirming, by the digital notary server, that the revised instruction set was built in trust;
adding, by the digital notary server, a different digital notary component to the initial side chain block in response to confirming that the revised instruction set was built in trust;
storing the initial side chain block in at least one of the non-transitory memory by the application or the block data store in the network;
creating a subsequent side chain block for the electronic device, wherein the subsequent side chain block comprises the revised instruction set and the different digital notary component;
validating the subsequent side chain block based on the different digital notary component without consensus from a plurality of consensus servers in the network; and
storing the subsequent side chain block in at least one of the non-transitory memory by the application or the block data store in the network in response to the validation of the subsequent side chain block.

8. The method of claim 1, wherein the digital notary component comprises a unique identifier and an identity of the digital notary server.

9. The method of claim 1, wherein the electronic device is one of a mobile phone, a personal digital assistant (PDA), a media player, a wearable computer, a headset computer, a laptop computer, a tablet computer, a notebook computer, or an Internet of Things (IoT) device.

10. A digital notary server, comprising:
a processor;
a non-transitory memory; and
an application stored in the non-transitory memory that, when executed by the processor:
receives an initial block for an electronic device comprising an instruction set,
confirms that the instruction set was built in trust,
adds a digital notary component to the initial block in response to confirming that the instruction set was built in trust,
stores the instruction set associated with the digital notary component in the non-transitory memory,
receives a subsequent block for the electronic device including the instruction set and the digital notary component, and
validates the subsequent block without consensus from a plurality of consensus servers by confirming that the instruction set and the digital notary component in the subsequent block match the stored instruction set and associated digital notary component from the initial block.

11. The digital notary server of claim 10, wherein the initial block is a birth block created via an original equipment manufacturer server in a network, and wherein the birth block comprises electronic device information associated with the electronic device.

12. The digital notary server of claim 10, wherein the initial block is a life block created by a server maintained by a wireless communication service provider in a network in response to the electronic device being provisioned on the network, and wherein the life block comprises provisioning information.

13. The digital notary server of claim 10, wherein the subsequent block is a life block created via a server maintained by a wireless communication service provider in a network in response to the electronic device being provisioned on the network or an event block created by a block foundry server in response to a triggering event specified in event block generation instructions.

14. The digital notary server of claim 10, wherein at least the initial block and the subsequent block form a chain of blocks, and wherein the chain of blocks is stored on at least one block data store in the network.

15. The digital notary of claim 10, wherein the subsequent block is stored in at least one of a non-transitory memory of the electronic device or a block data store in the network in response to the validation.

16. The digital notary of claim 10, wherein the application further:
receives an initial side chain block for the electronic device, wherein the side chain block comprises a revised instruction set,
confirms that the revised instruction set was built in trust,
adds a different digital notary component to the initial side chain block in response to confirming that the revised instruction set was built in trust,
stores the revised instruction set associated with the different digital notary component in the non-transitory memory,
receives a subsequent side chain block for the electronic device including the revised instruction set and the different digital notary component, and
validates the subsequent side chain block without consensus from a plurality of consensus servers in the network by confirming that the revised instruction set and the different digital notary component in the subsequent side chain block match the stored revised instruction set and associated different digital notary component from the initial side chain block.

17. A method of using a digital notary in distributed ledger technology (DLT) for block construction and verification, the method comprising:
creating a block for an electronic device comprising an instruction set, wherein the block is stored in a non-transitory memory of the electronic device;
confirming, by a digital notary server in the network, that the instruction set was built in trust;
adding, by the digital notary server, a digital notary component to the block in response to confirming that the instruction set was built in trust;
storing, by the digital notary server, the instruction set associated with the digital notary component in a non-transitory memory of the digital notary server;
creating a subsequent block for the electronic device, wherein the creating of the subsequent block comprises:
sending a validation request message based on a current instruction set to the digital notary server that comprises the current instruction set and a current digital notary component;
validating the subsequent block without consensus from a plurality of consensus servers by confirming, by the digital notary server, that the current instruction set and the current digital notary component match the stored instruction set and associated digital notary component from the block; and
in response to the validating, adding, by the digital notary server, a subsequent digital notary component to the subsequent block; and storing the subsequent block in at least one of the non-transitory memory by an application executing on a processor of the electronic device or a block data store in the network.

18. The method of claim 17, wherein the digital notary component and the subsequent digital notary component are the same.

19. The method of claim 17, wherein the digital notary component and the subsequent notary component are different.

20. The method of claim 17, wherein storing the subsequent block creates a chain of blocks that includes at least the block and the subsequent block, and wherein a hash of the block links the subsequent block and the block.

* * * * *